United States Patent

[11] 3,593,298

[72] Inventor Richard D. Armstrong
Canoga Park, Calif.
[21] Appl. No. 12,722
[22] Filed Feb. 19, 1970
[45] Patented July 13, 1971
[73] Assignee Burroughs Corporation
Detroit, Mich.

[54] DIGITAL STORAGE SYSTEM HAVING A DUAL-FUNCTION SEGMENTED REGISTER
15 Claims, 3 Drawing Figs.

[52] U.S. Cl. .......... 340/172.5
[51] Int. Cl. .......... G11b 13/00
[50] Field of Search .......... 340/172.5

[56] References Cited

UNITED STATES PATENTS

| | | | |
|---|---|---|---|
| 3,340,512 | 9/1967 | Hauck et al. | 340/172.5 |
| 3,348,213 | 10/1967 | Evans | 340/172.5 |
| 3,435,423 | 3/1969 | Fuller et al. | 340/172.5 |
| 3,439,343 | 4/1969 | Stahle | 340/172.5 |

*Primary Examiner*—Paul J. Henon
*Assistant Examiner*—R. F. Chapuran
*Attorney*—Christie, Parker and Hale

ABSTRACT: A digital storage system including a rotating magnetic recording disc and a plurality of read-write heads adjacent to and defining on a surface of the magnetic recording disc a corresponding plurality of data tracks, one of the data tracks containing address data. A clock head is also included in the system and defines a clock track on the disc surface for the storage of clock bits. The clock bits are read by the clock head and coupled to each of a plurality of independently operable and sequentially arranged shift registers for causing bits of data to shift serially through such registers. During information data read and write modes of operation, each shift register operates independently of one another to either: (1) receive serial read data bits at its input and supply them in parallel at its output; or (2) receive parallel write data bits at its input and supply them in series at its output. During the address data read mode of operation, however, serial address data bits are supplied only at the input of the first-in-sequence of shift registers and are then serially shifted through all the shift registers which operate together as a single continuous shift register. When the first address data bit is finally registered in the last-in-sequence of shift registers and the last address data bit in the first-in-sequence of shift registers, the address data bits are read out in parallel from all of the shift registers' output.

INVENTOR
RICHARD D. ARMSTRONG
BY
Christie, Parker & Hale
ATTORNEYS

DIGITAL STORAGE SYSTEM HAVING A DUAL-FUNCTION SEGMENTED REGISTER

BACKGROUND OF THE INVENTION

1. Field of the Invention

This invention pertains to digital storage systems and, more specifically, to a digital storage system employing a moving magnetic recording surface and a register for temporarily storing data being read from or written onto the recording surface.

1. Description of the Prior Art

Disc files are known having one or more discs each with one or more magnetic recording surfaces. Information is recorded in tracks defined by electromagnetic heads which read and write binary coded digital bits of information in the tracks.

One disc file is disclosed in U.S. Pat. No. 3,375,507 assigned to the same assignee as the present application. The disc file disclosed in the above-mentioned patent has a reading and writing transducer for each track. Data is selected for reading and writing by angular position of the disc and track. The angular position of the disc is indicated by addresses which are recorded in prefixed angular positions around the disc. The data information and the address information are each arranged into words. Each word is broken down into three bytes called characters. Each character his a plurality of binary coded digital bits of information. A single buffer register, one character in length, is used to store both address information being read and data information being read or written. In this regard, the address words are read out serial by character and bit. The bits are serially shifted into the single buffer register until one complete character is stored. The stored character is then compared against one of three characters of a desired address. This same procedure is followed for the second and third characters of an address, each character being stored individually in the same one character buffer register. When equality for all three characters of one address is detected, the corresponding data word is read. The data words are also read serial by character and bit. The bits of a character are serially shifted into the buffer register until one complete character is stored. The stored character is then transferred to another device such as a word buffer register for storage. This operation is repeated for the second and third characters of the same word, the bits of each character first being accumulated in the one character register and then transferred to the word buffer register. On writing a word, address reading and comparison is the same. However, to write the actual data word, the word is stored serial by character and parallel by bit into the single character register. After each character is stored, its bits are serially shifted out for storage at the corresponding address on the disc.

It is desirable to increase the packing density of the recorded information. To this end, the data reading reading and buffering scheme disclosed in U.S. Pat. No. 3,417,377, assigned to the same assignee as this application, has been used. A separate address storage register is used, but not disclosed therein, into which the bits of one complete address word are serially shifted. All bits of the address word are simultaneously compared for equality against a given address word. Data words are divided up into three bytes. Each byte has several binary coded bits. The bytes of each character are stored in separate tracks and are read parallel by byte and serial by bit through separate transducers. A separate buffer register is provided for each byte, and together the registers make up a total of one character of storage. The bits of each byte are serially shifted into the corresponding register. A complete byte is transferred, parallel by bit, from each register to another register capable of storing all bytes of one character. On writing, a byte is stored in each register parallel by byte and bit. The bits of each byte are then serially shifted out of each individual register to the corresponding transducer for recording on three different tracks.

SUMMARY OF THE INVENTION

The present invention is a marked improvement over the aforementioned disc file systems. The improvement involves the capability of the present invention to very rapidly read out or write data on a rotating member a word at a time while minimizing the amount of buffering and addressing circuits required to accomplish this task.

Briefly, a digital storage system in accordance with the present invention includes a moving magnetic recording member and a plurality of read-write electromagnetic heads adjacent thereto, each such head defining a data track on the recording member, and at least one of the data tracks containing address data. A plurality of independently operable and sequentially arranged shift registers are also included in the system, each register associated with a different head, and each having an input adapted to receive serial bits of data and a first output adapted to emit serial bits of data. First means are provided for selectively coupling the input of each shift register to its associated head thereby enabling the binary bits of data stored on the associated data track to be serially shifted into each individual shift register. Second means selectively couple the inputs of each shift register to the first outputs of each preceding-in-sequence shift register such that a single shift continuous shift register is formed from the plurality of independently operable shift registers. Additionally, third means are included in the system for selectively coupling the input of the single continuous shift register to the head associated with the track containing the address data thereby enabling the binary bits of an address to be serially shifted into the first-in-sequence of independent shift registers and then sequentially through the remaining independent shift registers.

The invention, therefore, contemplates a dual function performed by a plurality of sequentially arranged shift registers. Each shift register operates independently during the information data read mode of operation to temporarily store bits of data read from its associated data track on the recording member. During the address data read mode of operation, however, the shift registers operate in sequence as a single continuous shift register to temporarily store bits of address data read from the recording member.

In a further aspect of the invention, each shift register operates independently during a write mode of operation to temporarily store bits of data for a complete word to be written to its associated data track on the recording member.

In another aspect of the invention, a clock head is included in the system and is located adjacent the recording member thereby defining a clock track thereon. Clock bits are read from the track by the clock head and coupled to each of the independently operable shift registers thereby effectuating the shifting of data bits in each of the registers.

In yet another aspect of the invention, logic means are included in the system for providing separate control commands indicative of information data read and write modes, of operation for thereby enabling the system into a corresponding mode of operation.

BRIEF DESCRIPTION OF THE DRAWING

These and other aspects of the invention will now be described with reference to the drawing in which.

DESCRIPTION OF THE PREFERRED EMBODIMENT

Figure 1:
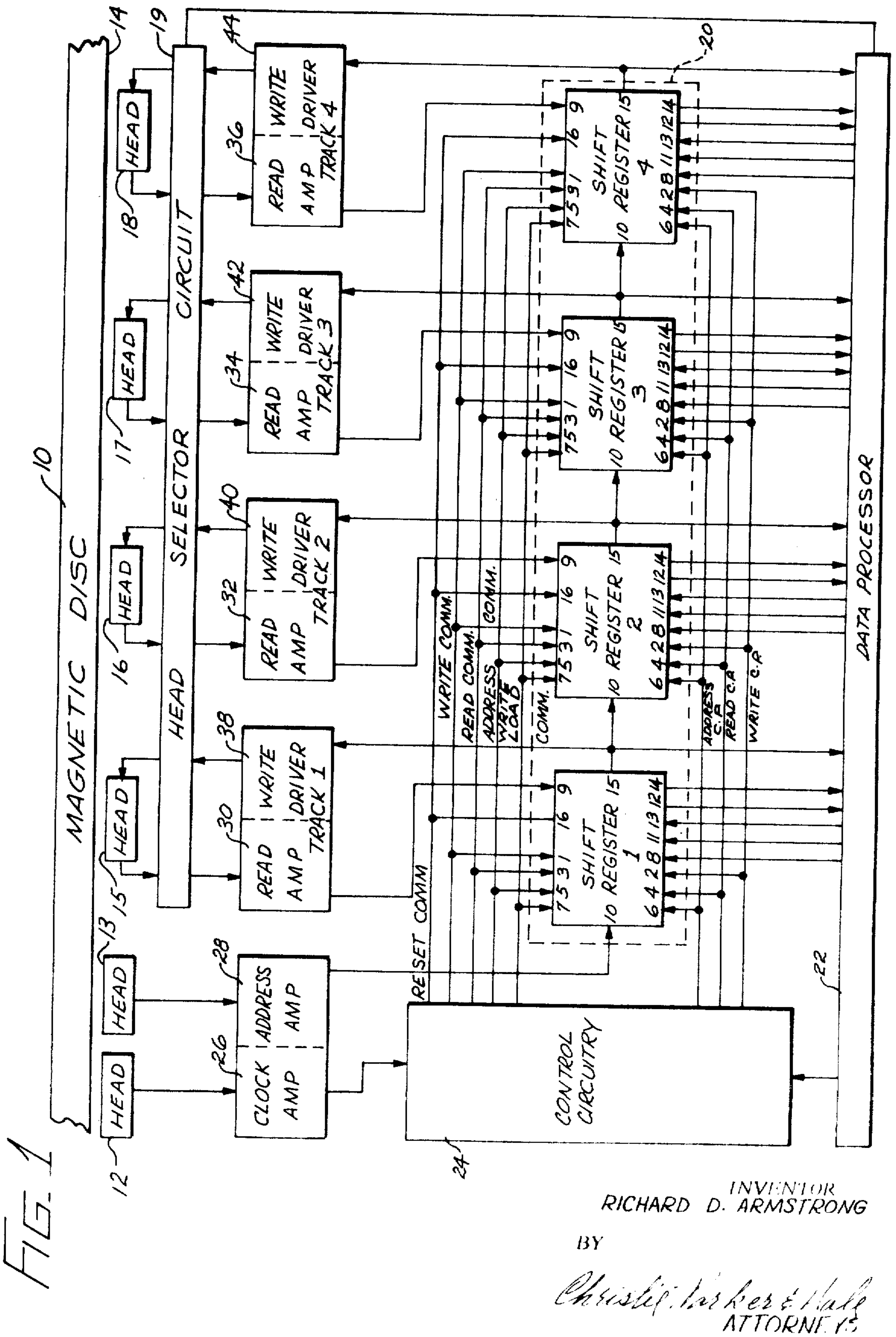
FIG. 1 is a simplified block diagram representation of a disc file memory utilizing the dual function segmented register of the present invention.

The disc file memory disclosed in FIG. 1 contains a plurality of magnetic disc recording surfaces 14 (only one being shown). Each magnetic recording disc 10 has a plurality of tracks on each surface. A clock track on each surface is used for the storage and retrieval of timing pulses (clock bits). Pulses in these clock tracks signify the location of various bits of data stored in all of the other tracks, hereinafter called data tracks. The clock track on each surface of the magnetic recording disc 10 is defined by an associated electromagnetic head 12, such head communicating the clock pulses stored in the clock track to any shift registers that may be employed in the disc file memory (hereinafter described).

The disc file memory disclosed in FIG. 1 contains four data tracks and one clock track on magnetic disc recording surface 14 (such tracks not being physically shown). In the disclosed embodiment of the invention one word is broken down into four bytes and each byte has three binary coded bits. One word is stored in four different tracks, one byte being stored, serial by bit, in each different one of the four tracks. Four data tracks are shown for purposes of example, it being realized that there are generally many more such data tracks on each disc surface. As has been stated heretofore, the electromagnetic head 12 is associated with the clock track for reading clock pulses therefrom and supplying them to shift registers 1, 2, 3 and 4 in a manner which will be hereinafter fully and completely described. Electromagnetic head 13 is utilized to read address data stored on a separate track on magnetic disc recording surface 14 and supply such data to shift register 1 (again in a manner which will be fully hereinafter described). Electromagnetic heads 15, 16, 17 and 18 are each respectively associated with data tracks 1, 2, 3 and 4 and read out write one word. In addition, each of the heads have dual functions, i.e. reading or writing from or to their associated data tracks on magnetic disc recording surface 14.

Associated with heads 15, 16, 17 and 18 is head selector circuit 19. Head selector circuit 19 is capable of selecting heads 15, 16, 17, 18 or any other set of four heads (not shown) on the disc 14. If data processor 22 desires to communicate with heads 15, 16, 17 and 18, an appropriate signal is sent to head selector circuit 19 which enables these heads to perform either read or write functions. Other sets of four heads are selected in a similar manner.

Dual function segmented register 20 operates to temporarily store bits of data making up a complete word read from the data tracks by associated electromagnetic heads and to transmit such word of data to data processor 22. Register 20 further operates to temporarily store a word of data from data processor 22 and to transmit such word of data to associated ones of the heads (in a manner more fully described below). It will be evident that the invention is not limited to a data processor for receiving and transmitting words of data to register 20. For example, a single register may be provided.

Further disclosed in FIG. 1, is control circuitry 24 which operates to establish either a read, write or address mode of operation for the disc file memory by sending out either a WRITE, READ, or ADDRESS command signal to register 20, and to receive clock pulses from electromagnetic head 12 and then supply them to register 20. Connecting head 12 to control circuitry 24 is clock amplifier 26 which operates to amplify the clock pulses read from an associated clock track on magnetic disc recording surface 14 through electromagnetic head 12 and supply such amplified clock pulses to control circuitry 24 which, in turn, supplies them to register 20.

Although a data word is stored in four different tracks a complete address word is serially stored in a single track under address head 13.

Connected between electromagnetic head 13 and register 20 is address amplifier 28 which operates to amplify address data bits read from the associated data track and to supply them to register 20. Read amplifiers 30, 32, 34 and 36 are respectively associated with tracks 1, 2, 3 and 4 and operate to amplify data bits read from such tracks through associated electromagnetic head 15, 16, 17 and 18 and supply them to register 20 in a manner which will be fully and completely described below. Finally, write drivers 38, 40, 42 and 44 each couple the serial write data bits supplied from register 20 to associated tracks on recording surface 14 through an associated electromagnetic head.

For purposes of completeness, it must be pointed out that the blocks labeled "READ AMP" and "WRITE DRIVER" are merely symbolic of a number of interconnected elements. In the preferred embodiment disc-file memory using the dual-function register, the so-called "READ AMP" really includes the serial combination of a preamplifier circuit, a preamplifier selector circuit, and a read amplifier. Furthermore, the so-called "WRITE DRIVER" really includes a write driver circuit in series with an associated write driver selector circuit. A signal from data processor 20 causes a specific one of the write drivers to be selected by head selector circuit 19, thereby enabling its associated head to write bits of data onto the associated data track.

The block diagram representation of the disc-file memory of FIG. 1 will now be more fully and completely described with particular reference to dual function segmented register 20. As mentioned heretofore, four data tracks and one clock track are disclosed with regard to magnetic disc recording surface 14, for reading or writing one word of information. Associated, respectively, with the data tracks are shift registers 1, 2, 3, and 4, forming register 20. Each shift register independently operates to receive serially supplied read data bits from respective read amplifiers, and to supply such read data bits in parallel to data processor 22. Each shift register also independently operates to receive parallel write data bits from data processor 22 and to supply such write data bits in series through respective write drivers and electromagnetic heads to the disc recording surface 14.

During reading or writing, therefore, each shift register operates independently with regard to the specific data bits supplied to it and to be transmitted by it. During the address reading mode of operation, however, shift registers 1, 2, 3 and 4 do not function independently, but rather function sequentially as a single continuous shift register. In other words, upon the receipt by shift register 1 of address data bits supplied in series from address amplifier 28, such address data bits are serially shifted through all of the shift registers until the first address data bit received by shift register 1 is registered in the last storage device of shift register 4 and the last address bit received by shift register 1 is registered in the first storage device of such register.

Figure 2:
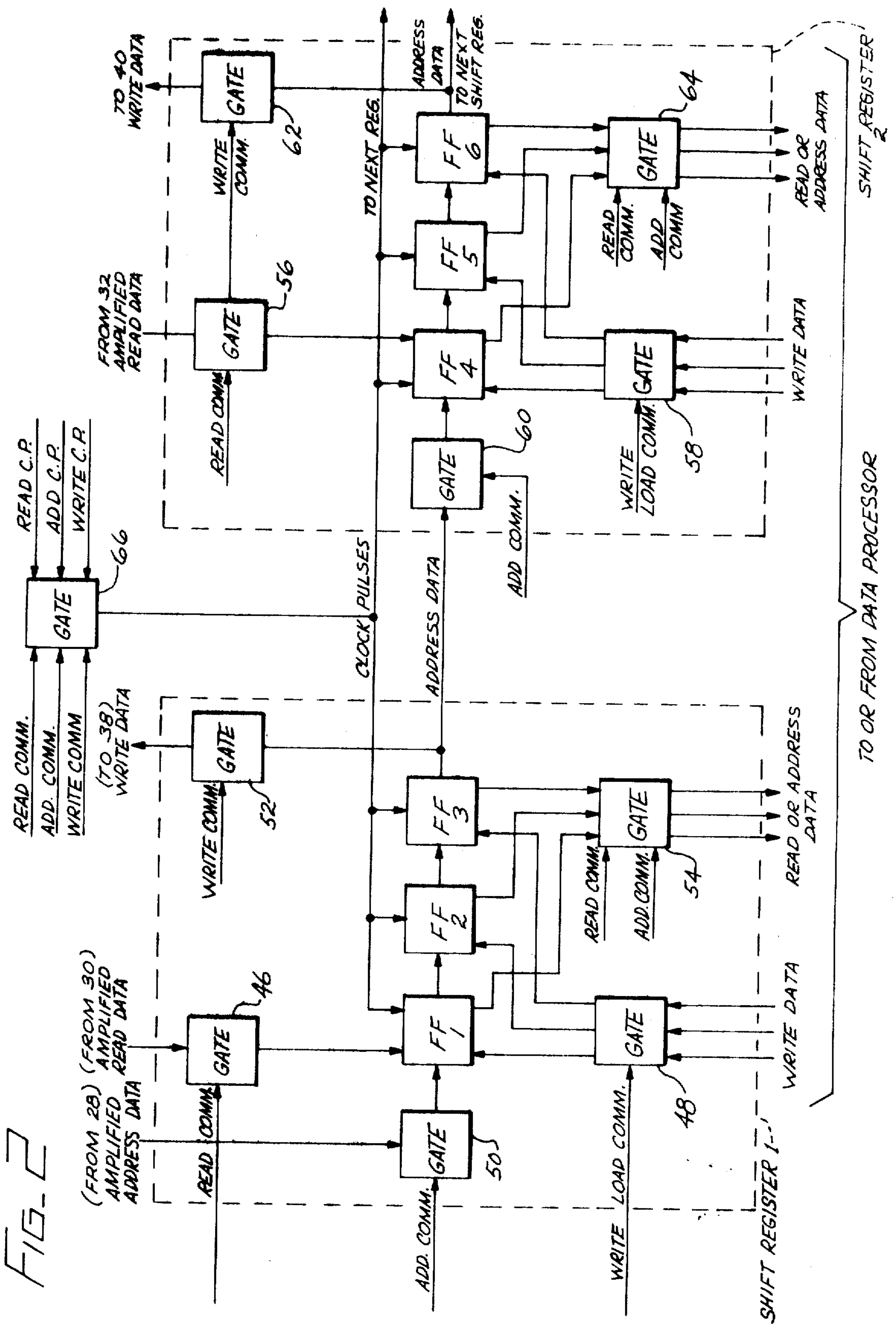
FIG. 2 is a more specific block diagram representation of the dual function segmented register of FIG. 1 with only the functional effect of shift registers 1 and 2 being shown.

FIG. 2 is a more detailed block diagram representation of a portion of register 20. More specifically, shift registers 1 and 2 have their elements shown in block diagram so that an explanation of the operative effect of the entire register 20 can be more simply described. Shift registers 1 and 2 are each shown having three flip-flop circuits, identified as FF1, FF2 and FF3, in shift register 1, and FF4, FF5, and FF6 in shift register 2. In actuality the block diagram of each flip-flop is representative of a flip-flop circuit, an inverter, and an OR gate (shown and explained in detail in the discussion below with regard to FIG. 3).

Gate 46 in shift register 1 supplies amplified read data bits from read amplifier 30 (FIG. 1) in series to an input of FF1 upon the receipt by such gate of a READ command from control circuitry 24 (FIG. 1). Gate 48 supplies parallelly applied write data bits through an input of each of FF1, FF2, and FF3 upon the receipt by such gate of a WRITE LOAD Command from control circuitry 24. Gate 50 supplies amplified address data from address amplifier 28 serial by bit to an input of FF1 upon the receipt by such gate of an ADDRESS command from control circuitry 24. Gate 52 supplies write data bits in series from the output of FF3 to write driver 38, upon the receipt by such gate of a WRITE COMMAND FROM CONTROL CIRCUITRY 24.

The final element in shift register 1, as shown in FIG. 2, consists of gate 54 which passes read or address data bits in parallel from respective outputs of FF1, FF2, and FF3 to the data processor, upon receipt by such gate of either a READ or ADDRESS command from control circuitry 24, respectively. In regard to shift register 2 disclosed in FIG. 2, gates 56, 58, 60, 62, and 64 function identically to gates 46, 48, 50, 52, and 54 of shift register 1. Registers 3 and 4 are identical to register 2 and are connected to registers 2 and 3 respectively the same way register 2 is connected to register 1.

As has been stated previously, bits of data are shifted serially through the flip-flop circuits of shift registers 1—4 upon the receipt by such flip-flops of clock pulses. Clock pulses are supplied to the flip-flops of shift registers 1 and 2 through gate 66. An exact and complete description of the elements contained in gate 66 will become apparent in the following review of FIG. 3. At this time, however, it is sufficient to say that gate 66 passes clock pulses upon its simultaneous receipt of either: (1) a READ command and read clock pulses from control circuitry 24; (2) an ADDRESS command and address clock pulses from control circuitry 24; or (3) a WRITE command and write clock pulses from control circuitry 24.

In operation, and with regard to FIG. 2, assume that an address has been read and sent to processor 22 and an equality with a desired address has been detected, also, assume certain bits of data are to be read from such address on magnetic disc recording surface 14 through electromagnetic heads 15, 16, 17 and 18. With this the case, the processor sends a signal to circuit 19 (FIG. 1) causing heads 15, 16, 17, and 18 to be selected. Furthermore, data processor 22 sends an appropriate request to control circuitry 24 (FIG. 1) which in turn sends out a READ command to gates 46, 54, and 66. At the same time, clock pulses are read from the associated clock track on magnetic disc recording surface 14 through head 13, clock amplifier 26 and then to control circuitry 24 which operate to send read clock pulses to gate 66. Gate 66 responsive to the READ command will pass clock pulses to the flip-flops in all of registers 1—4.

Three read data bits, therefore, amplified by read amplifier 30 are supplied through gate 46 in series to an input of FF1. Three different data bits are serially supplied by each of heads 16, 17 and 18 through a gate, such as 56, in each of registers 2—4. These three bits of serially supplied read data from each of head 16, 17 and 18 are serially shifted through the remaining flip-flops in the corresponding shift registers responsive to the clock pulses.

When all of the flip-flops in each shift register have finally registered a read data bit, such registered read data bits are available in parallel from respective outputs of the flip-flops in each shift register. The gate 54 in register 1, gate 64 in register 2 and the corresponding gates in each of the other registers 3 and 4 pass such read data bits in parallel to the data processor since each has received a READ command from control circuitry 24.

By further way of example of the operation of the system disclosed in FIG. 2, assume that address coincidence has been detected and that certain bits of data are to be written and stored through heads 15—18 on magnetic disc recording surface 14. With this the case, an appropriate signal is sent to circuit 19 causing heads 15—18 to be selected. Furthermore, a request is sent by data processor 22 to control circuitry 24 which sends a WRITE LOAD command to gates 54 and 58 in shift registers 1 and 2 and to the corresponding gates in registers 3 and 4 and simultaneously applies a WRITE command to gate 66 and to gates 52 and 62 in registers 1 and 2 and to the corresponding Gates in registers 3 and 4. At the same time, write clock pulses are also supplied to gate 66 in the same manner as above described with regard to the read clock pulses. The WRITE LOAD command lasts only one clock pulse, whereas the WRITE command lasts four clock pulses. Once again, gate 66 passes such clock pulses to the flip-flops in each shift register. Three bits of write data are supplied in parallel to respective inputs of the flip-flops of each shift register responsive to the WRITE LOAD command. Such write data bits are then serially shifted through the flip-flops of the corresponding shift register to the corresponding head responsive to the WRITE command. Consider shift register 2 by way of example. The data bits are serially shifted through FF4, FF5, and FF6 and out the output of FF6 to gate 62. Once again, this shifting action is caused by clock pulses being simultaneously supplied to respective inputs of all of the flip-flops from gate 66. Three bits of write data are thus supplied in series through gate 62 (under control of the WRITE command) and write driver 40 through electromagnetic head 16 for recording on track 2 of surface 14.

In regard to information data read and write modes of operation, therefore, the shift registers of register 20 operate and function independently with a corresponding head. For example, the three bits of read data that are supplied in series to an input of FF1 are applied to data processor 22 in parallel from the outputs of FF1, FF2, and FF3. Another three distinct read data bits supplied in series to an input of FF4 are applied to data processor 22 in parallel from the outputs of FF4, FF5, and FF6. Each shift register thus communicates between a distinct associated track on disc surface 14 and the data processor. The reverse action is also true where bits are stored in each shift register in parallel and then independently shifted into the respective head.

An important aspect of the present invention involves the ability of all the shift registers comprising register 20 to preempt their independent functioning carried on during information data read and write modes in order to function sequentially and singularly as a continuous shift register during the address data read mode of operation. In other words, when reading address data bits from magnetic disc recording surface 14, such data bits, supplied to an input of FF1 (FIG. 2), are serially shifted through all of the flip-flops until final registration in the last flip-flop of shift register 4 (FIG. 1).

To initiate this operation, the processor 22 applies a control signal to control circuitry 24 causing an ADDRESS command signal to be formed and applied to gate 66 and to gates 50 and 60 of shift registers 1 and 2 and to the corresponding gates of shift registers 3 and 4. Address data bits are read from disc surface 14 through electromagnetic head 13, amplified by address amplifier 28, and then supplied in series to gate 50 of register 1. Gate 50 passes such serial address data bits to an input of FF1 since an ADDRESS command is supplied from control circuitry 24 to such gate. At the same time, gate 66 supplies clock pulses simultaneously to all of the flip-flops of shift registers 1 and 2 since it simultaneously receives an ADDRESS command and address clock pulses from control circuitry 24.

The address data bits arriving at FF1, therefore, are serially shifted through FF2 and FF3 and then to an input of gate 60 which passes them to an input of FF4 since it has also received an ADDRESS command from control circuitry 24.

The address data bits are thus serially shifted through the flip-flops of each shift register until the first address bit is finally registered in the last flip-flop of the shift register 4 in register 20. The ADDRESS command signal is also applied to gates 54 and 64 in registers 1 and 2 and the corresponding gates in registers 3 and 4 causing the address data bits to be supplied in parallel from all flip-flops in register 20 to the data processor.

The specific logic circuitry employed in each of the shift registers 1 of FIGS. 1 and 2 will now be described with reference to FIG. 3. It should be noted that gate 66 of FIG. 2 comprises AND gates 80, 82, and 84 and OR gate 86. In addition, gate 54 of FIG. 2 comprises OR gate 88 and AND gates 90, 92, and 94. Furthermore, gate 48 of FIG. 2 is comprised of the functional combination of AND gates 96, 98, 100, 102, 104, and 106. As will be seen, when a WRITE LOAD command is present, gates 104 and 106 will be inhibited, by inverter 99, from shifting bits from one flip-flop to the next. Lastly, gates 46, 50, and 52 of FIG. 2 find full equivalence in AND gates 46, 50, and 52 of FIG. 2. With reference back to FIG. 1, it should be noted that all of the numbered inputs to shift register 1 are also found in appropriate places representing corresponding inputs in FIG. 3.

Figure 3:
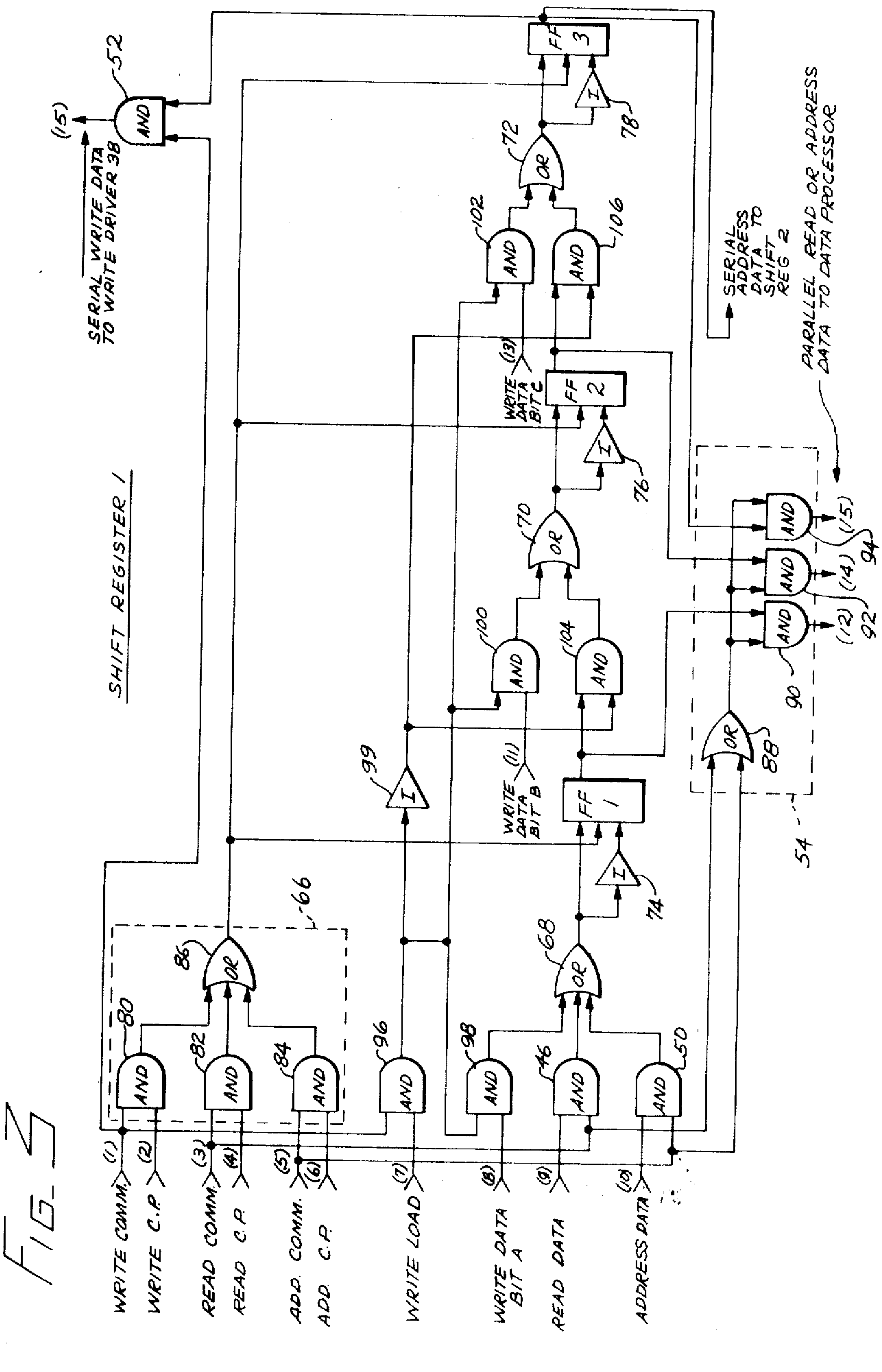
FIG. 3 is a detailed logic diagram of shift register 1 used in the dual function segmented register of the present invention.

In operation, and with regard to FIG. 3, assume that data processor 22 desires to read, an appropriate request is sent to control circuitry 24 which applies a READ command to AND gates 82 and 46. The three bits of serial read data are supplied to AND gate 46, and the read clock pulses from control circuitry 24 are supplied to AND gate 82. AND gate 46, receiving information at both of its inputs, serially produces an output representing the three serial read data bits as the data bits are applied to gate 46. Similarly, AND gate 82, receiving information at both of its inputs, produces an output representative of read clock pulses.

The read data bits and clock pulses are supplied respectively to OR gates 68 and 86 which operates to pass them. The read data bits passed by OR gate 68 are then supplied directly to FF1 and through an inverter 74 to FF1 (J-K flip-flops being used), whereas the clock pulses passed by OR gate 86 are supplied simultaneously to respective inputs of FF1, FF2 and FF3. With this the case, the first read data bit, originally registered in FF1, is shifted through AND gate 104 and OR gate 70 to FF2 and, upon the next simultaneous application of clock pulses to the flip-flop circuits, through AND gate 106, OR gate 72 to flip-flop 3 where it is finally registered. Similarly, the second read data bit is finally registered in flip-flop 2 and the third read data bit is finally registered in flip-flop 1.

When all the flip-flops have so registered a respective read data bit, the three read data bits are applied in parallel from respective outputs of each of the flip-flops to gate 54. OR gate 88 in AND gate 54, having received a READ command from control circuitry 24, passes a control signal simultaneously to AND gates 90, 92, and 94, the other respective inputs of such AND gates receiving a distinct one of the three read data bits. The three read data bits, therefore, are supplied, respectively, via the outputs of AND gates 90, 92, and 94, in parallel, to data processor 22.

By further way of example of the operation of shift register 1, as disclosed in FIG. 3, assume that an address is to be read from the associated track on magnetic disc recording surface 14. An appropriate request is sent to control circuitry 24 which sends an address command to AND gates 84, and 50 and to OR gate 88 in gate 54. Serial address data bits read from the magnetic disc surface 14 are supplied to AND gate 50. At the same time, read clock pulses read by electromagnetic head 13 from the associated clock track on surface 14 are supplied through clock amplifier 26 and control circuitry 24 to AND gate 84. AND gate 50, receiving information at both of its inputs, produces an output indicative of the serial address data bits.

The address data bits are then supplied to an input of OR gate 68. OR gate 68 supplies such address data bits in series directly to FF1 and in series through inverter 74 of FF1. At the same time, address clock pulses are produced at the output of AND gate 84 supplied to OR gate 86, passed therethrough, and then supplied simultaneously to FF1, FF2, and FF3. With this the case, the address data bits are serially shifted through FF1, FF2 and FF3 in the exact same manner as regards the shifting of read data bits therethrough. Such address data bits, however, continue to be shifted through FF4, FF5 and FF6 of shift register 2 and the flip-flop circuits of shift registers 3 and 4 since the ADDRESS command from control circuitry 24 causes gate 60 (associated with shift register 2), and similar gates associated with shift registers 3 and 4 to pass such serially shifted address data.

Returning to FIG. 3, the outputs from gate 54 consist of the address data bits finally registered in FF1, FF2, and FF3 and supplied in parallel to the data processor, exactly as is done with regard to read data bits.

During the information data read and address data read modes of operation, therefore, each shift register, as exemplified by shift register 1 in FIG. 3, operates to receive serial data bits from respective tracks and supply such data bits in parallel to the data processor. In addition, and during the address mode of operation only, as has been specifically pointed out above and with regard to the explanation of FIGS. 1 and 2, the address data bits are serially shifted through all of the flip-flops in all of the shift registers forming a part of the single continuous shift register 20.

By way of a last example of the operation of the shift register disclosed in FIG. 3, consider that the data processor desires to write three bits of data onto track 1 of magnetic recording surface 14. Once again, an appropriate request is sent to control circuitry 24 which sends a WRITE LOAD command to AND gate 96 and simultaneously therewith a WRITE command to AND gates 96, 80, and 52. Gate 96, therefore, passes a command signal indicative of a WRITE LOAD command, such signal being supplied to inverter 99. Inverter 99 inhibits gates 104 and 106 from allowing bits, registered in FF1 and FF2, respectively, to be serially shifted into FF2 and FF3, respectively. The WRITE LOAD command lasts one clock pulse and causes 3 write data bits to be loaded in parallel into the respective flip-flops without being shifted out. After the WRITE LOAD command terminates, no signal (binary 0) will be supplied to the input of inverter 99 causing a signal (binary 1) to be supplied at its output to AND gates 104 and 106 thereby causing the three bits loaded in the shift register to be shifted through the register. The write clock pulses passed by OR gate 86 and supplied simultaneously to FF1, FF2, and FF3 effectuate the serial shifting of the write data bits through the flip-flops (AND gates 104 and 106 being no longer inhibited by inverter 99 from passing data bits). The serial write data bits are coupled from the output of FF3 to AND gate 52 which passes them to write driver 38.

During the write mode of operation, the shift register operates to receive parallel write data bits and supply such data bits in series to write driver means for application to an electromagnetic head for storage of such write data bits on a respective track in the electromagnetic disc surface.

What has been disclosed, therefore, is a unique dual function segmented register used in a disc-file memory, such register consisting of a plurality of shift registers. During information data read and write modes of operation, each shift register operates independently of one another to either: (1) receive serial read data bits and supply them in parallel to the data processor; or (2) receive parallel write data bits and supply them in series to an electromagnetic head for recording on a track in the magnetic disc recording surface. During the address data read mode of operation, however, the uniqueness of the dual function segmented register is manifest. Serial address bits are supplied to the first-in-sequence of flip-flop circuits of the first shift register and are then serially shifted through all of the flip-flop circuits of all of the shift registers until the first address data bit is finally registered in the last-in-sequence of flip-flop circuits in the last-in-sequence of shift registers, and so on until the last address data bit is finally registered in the first-in-sequence of flip-flop circuits of the first-in-sequence of shift registers. When all of the address data bits have been so shifted and registered, they are then supplied in parallel to the data processor.

What I claim is:

1. In a digital storage system, the combination comprising:

a. a moving magnetic recording member;

b. a plurality of read-write electromagnetic head adjacent the recording member, each such head defining a data track for recording binary-coded bits of data on the recording member, at least one of the data tracks containing address data;

c. a plurality of independently operable and sequentially arranged shift registers, each associated with a different one of said heads, and each having an input adapted to receive serial bits of data and a first output adapted to emit serial bits of data;

d. first means for simultaneously and selectively coupling the input of each of the shift registers to its associated head thereby enabling the binary bits of data stored on the associated data tracks to be serially shifted into each individual shift register;

e. second means for selectively coupling the shift register together in series with the inputs of each shift register being coupled to the first outputs of each preceding-in-sequence shift register such that a single shift register is formed from the plurality of independently operable shift registers with an input for the input of the first-in-sequence independent shift register; and f. third means for selectively coupling the input of the single shift register to the head associated with the track containing the address data thereby enabling the binary bits of an address to be serially shifted into the first-in-sequence of independent shift registers and then sequentially through the remaining independent shift registers.

2. The combination of claim 1, further comprising fourth means for each independent shift register, each for coupling the first output of its associated shift register to the electromagnetic head associated therewith, thereby enabling the bits in each independent shift register to be serially shifted out thereof through the associated head and stored in the associated data track on the recording member.

3. The combination of claim 2, further including means for requesting binary bits of data from the magnetic recording members and for supplying binary bits of data into each of the independent shift registers in parallel.

4. The combination of claim 3, further comprising fifth means for coupling registers to the means for requesting binary bits of data in parallel.

5. The combination of claim 4, further including a clock head adjacent the recording member and defining a clock track for supplying clock bits through the clock head to each of the plurality of independent and sequentially arranged shift registers thereby enabling each such shift register to serially shift bits of data therethrough in synchronism with the movement of the record member.

6. In a digital storage system, the combination comprising:

a. a moving magnetic recording member;

b. a plurality of read-write electromagnetic heads adjacent the recording surface, each such head defining a data track for recording binary-coded bits of data on the recording member, at least one of the data tracks containing address data;

c. logic means for providing separate control commands indicative of read and address modes of operation;

d. a plurality of independently operable and sequentially arranged shift registers, each associated with a different one of the heads, and each having an input adapted to receive serially bits of data and a first output adapted to emit serial bits of data;

e. first means for coupling the input of each of the shift registers to its associated head, responsive to a control command from the logic means indicative of a read mode of operation, thereby enabling binary bits of data stored in the associated data track to be serially shifted into each individual shift register;

f. second means for coupling the shift registers together in series, the input of each shift register being coupled to the first output of each preceding-in-sequence shift register, said second means being responsive to a control command from the logic means indicative of an address mode of operation, such that a single shift register is formed from the plurality of independently operable shift registers with an input corresponding to the input of the first-in-sequence independent shift register; and g. third means for coupling the input of the single shift register to the head associated with the track containing the address data, responsive to a control command from the logic means indicative of an address mode of operation, thereby enabling the binary bits of an address to be serially shifted into the first-in-sequence of independent shift registers and then sequentially through the remaining independent shift registers.

7. The combination of claim 6, in which the logic means provides a separate control signal indicative of a write mode of operation; and, further including fourth means, for each independent shift register, each for coupling the first output of its associated shift register to the electromagnetic head associated therewith, responsive to a control command from the logic means indicative of a write mode of operation, thereby enabling the bits in each independent shift register to be serially shifted out thereof, through the associated head, and stored in the associated data track on the recording member.

8. The combination of claim 7, further including means for requesting binary bits of data from the magnetic recording member and for supplying binary bits of data into each of the independent shift registers in parallel.

9. The combination of claim 8, further comprising fifth means, coupling the shift registers in parallel to the means for requesting binary bits of data responsive to a control command from the logic means indicative of either an information data read or an address data read mode of operation.

10. The combination of claim 9, wherein each of the independent shift registers includes means, responsive to control command from the logic means indicative of either an information data read or an address data read mode of operation, for serially shifting the binary bits therein.

11. The combination of claim 10, in which the logic means provides a separate control signal indicative of an information data write load operation; a.

a. further including means responsive to the write load control signal for storing bits of data in parallel into each of the shift registers.

12. The combination of claim 11, further including means, responsive to a write load command signal from the logic means, for inhibiting the shifting of the bits, supplied in parallel, serially through each shift.

13. The combination of claim 12, further including a clock head adjacent the recording member and defining a clock track for supplying clock bits at a predetermined frequency of occurrence.

14. The combination of claim 13, further including means, responsive to the receipt of a command signal from the logic means, for supplying the clock bits to each of the plurality of independent shift registers thereby enabling each to serially shift bits of data therethrough.

15. In a data processing system, the combination comprising:

a. a magnetic recording disc with a surface having a clock track and a plurality of data tracks defined, respectively, by a first electromagnetic head adapted to read clock pulses stored on the clock track and by a plurality of second electromagnetic head each associated with a different data track;

b. means for reading information from or writing information to the magnetic disc recording surface;

c. a plurality of sequentially arranged and independently operable shift registers respectively associated with the plurality of data tracks;

d. first means coupling bits of data, read from each data track, by associated second electromagnetic heads, in series, to an associated shift register;

e. second means coupling clock pulses, read from the clock track by the first electromagnetic head, simultaneously to each of the shift registers thereby causing the bits of read data supplied to each shift register to shift therethrough, each shift register operating independently of one another during data track reading to convert serial read data bits supplied thereto into parallel read data bits;

f. third means coupling the read data bits from each shift register in parallel to the means for reading information;

g. fourth means coupling bits of address data read from the magnetic disc recording surface to the first-in-sequence of shift registers;

h. means causing the address data bits to shift serially through all of the shift registers until the first address data bit is registered in the last-in-sequence of shift registers and the last address data bit is registered in the first-in-sequence of shift registers, the shift registers thus operating in sequence as a single continuous shift register; and i. fifth means coupling the registered address data bits from each shift register in parallel to the means for reading information.